United States Patent
Calcaterra et al.

[11] 3,975,828
[45] Aug. 24, 1976

[54] ADJUSTABLE MASTER SETTING GAUGE

[75] Inventors: Bernard Jacob Calcaterra, Joliet; Harold Edward Ogg, Jr., Dwight; James Herschell Osborne, Peotone, all of Ill.

[73] Assignee: Caterpillar Tractor Co., Peoria, Ill.

[22] Filed: Jan. 8, 1975

[21] Appl. No.: 539,372

[52] U.S. Cl. .................................................. 33/165
[51] Int. Cl.² ........................ G01B 3/18; G01B 5/00
[58] Field of Search ............... 33/165, 170, 147 E, 33/147 F, 163, 164 R, 143 R

[56] References Cited
UNITED STATES PATENTS

| | | | |
|---|---|---|---|
| 924,668 | 6/1909 | Jacques | 33/165 |
| 1,655,239 | 1/1928 | Priputnevich | 33/165 |
| 2,401,920 | 6/1946 | Farrance | 33/165 |
| 2,440,710 | 5/1948 | Bauer | 33/170 |
| 2,544,004 | 3/1951 | Bauer | 33/170 |
| 2,713,208 | 7/1955 | Bizzoco et al. | 33/170 |
| 3,049,807 | 8/1962 | Smeets | 33/165 X |

OTHER PUBLICATIONS
American Machinist, Mar. 29, 1945, p. 135, Pla-Chek, by Cadillac Gage Co.

*Primary Examiner*—Richard E. Aegerter
*Assistant Examiner*—Michael H. Thaler
*Attorney, Agent, or Firm*—Phillips, Moore, Weissenberger Lempio & Strabala

[57] ABSTRACT

The invention relates to an adjustable master setting gauge. The gauge comprises a frame including a generally flat portion. A bar is mounted generally parallel to the flat portion, the bar comprising a portion of a height gauge fixture, one end of the bar being slidably supported within a base, and the other end of the bar being telescopically attached to a micrometer head. A bracket extends from the frame, the bracket including a first gauging surface laterally removed from the bar. The adjustable master setting gauge further includes a gauge mounting member detactably attachable to the bar and having an arm extending laterally from the bar. The arm includes a second gauging surface and the first and second gauging surfaces are laterally removed generally an equal distance from the bar. Thus, the distance between the first gauging surface and the second gauging surface can be adjusted by rotation of the micrometer head. This allows calibration of snap gauges from the first gauging surface to the second gauging surface.

6 Claims, 4 Drawing Figures

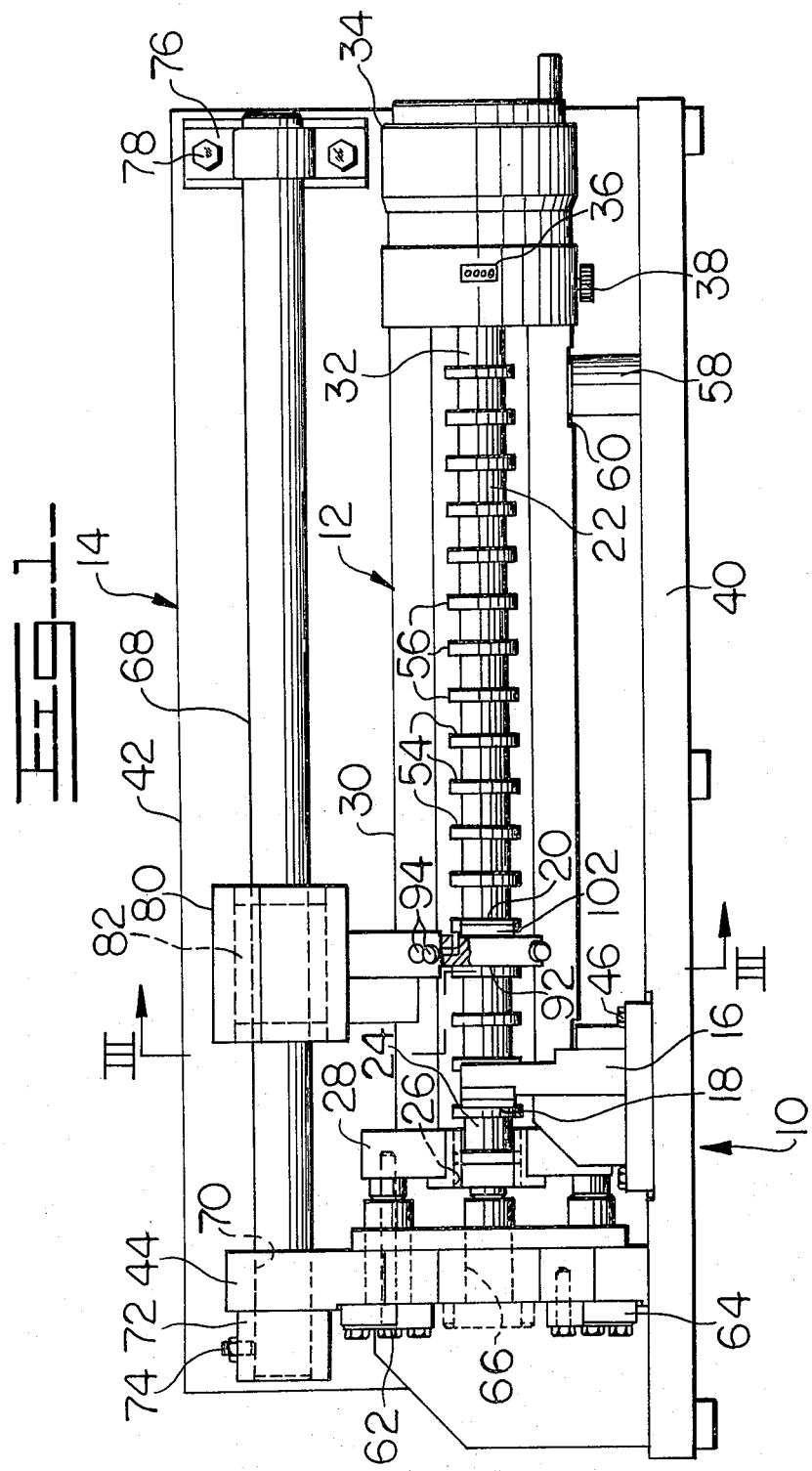

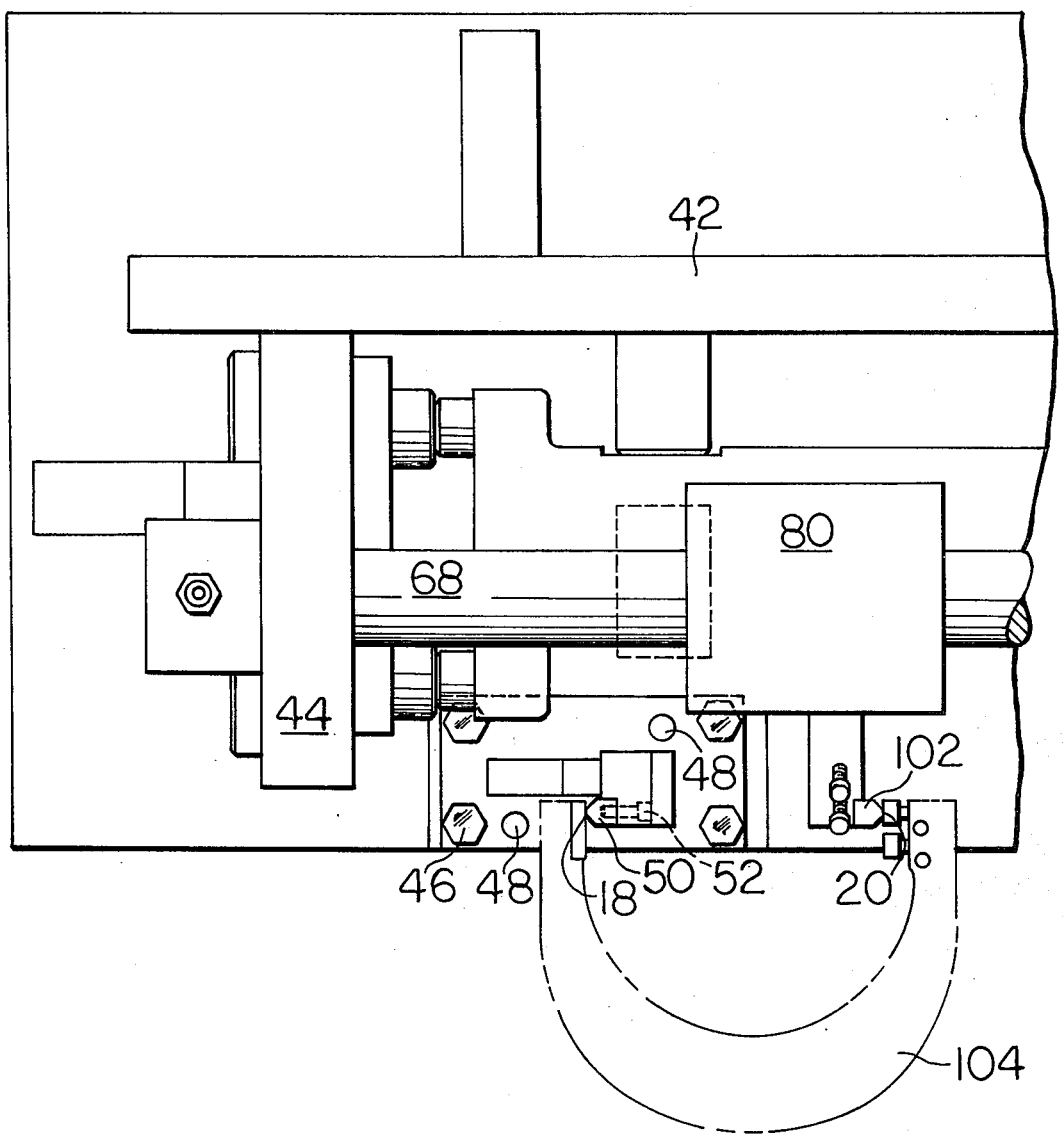

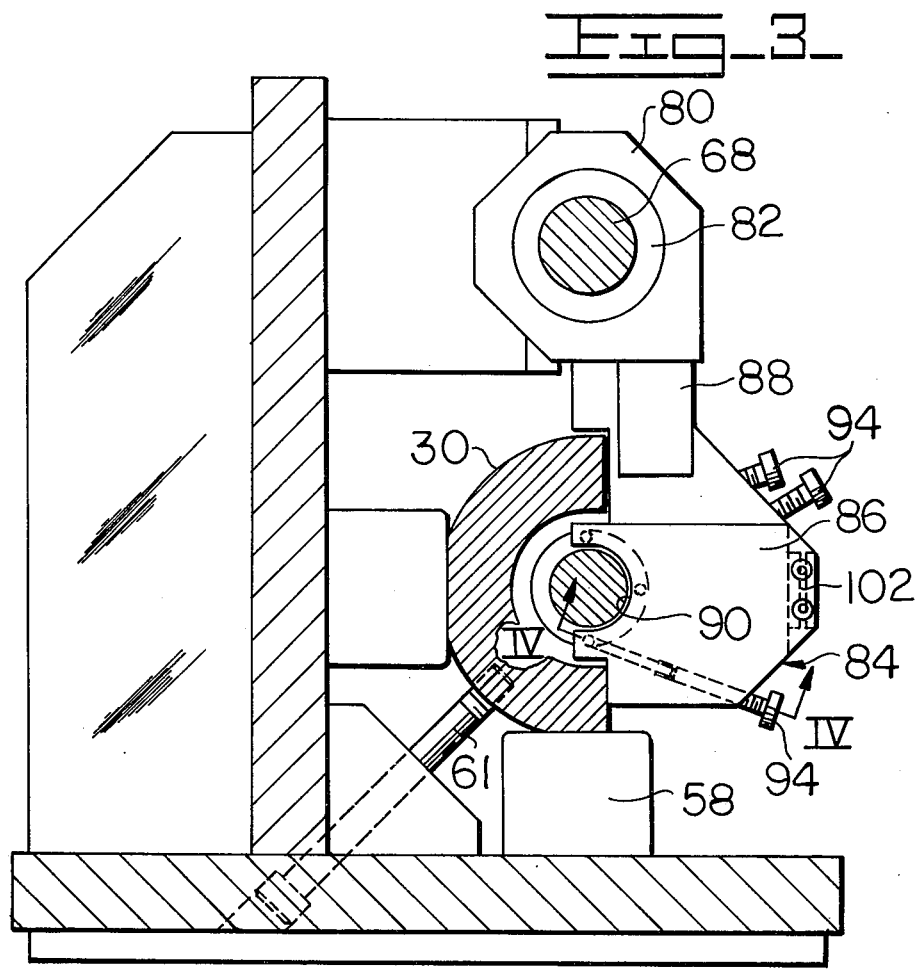
Fig_3
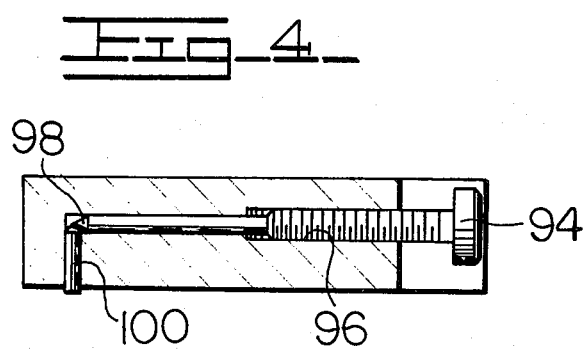
Fig_4

ADJUSTABLE MASTER SETTING GAUGE

BACKGROUND OF THE INVENTION

1. Field of the Invention

Adjustable limit snap gauges are very widely used for quickly determining if the outside diameter of machined parts are within allowable tolerance limits. Checking and calibration of such snap gauges is a time consuming and tedious operation. The present invention is concerned with an adjustable master setting gauge which makes possible the quick and accurate checking and calibration of snap gauges.

2. Prior Art

Any number of height gauge fixtures are well known in the prior art. Typical of such gauges are those described in U.S. Pat. Nos. 2,440,710 and 2,544,004 and in the brochure entitled PLA-CHEK published by the Cadillac Gage Co. of Warren, Michigan in 1970. Briefly, the prior art gauges include a base with an elongated open-sided column extending upwardly therefrom, a micrometer head atop the column and a bar extending from the micrometer head to the base, the bar having a plurality of equally spaced ridges annually upraised therefrom. Such gauges as are known to the prior art are generally extremely accurate but are often not convenient for use with the typical industrial snap gauges. In particular snap gauges, and especially larger snap gauges, are often too large to fit between the equally spaced ridges which are upraised from the bars of the prior art snap gauges. Further, even if the snap gauges are small enough to fit between adjacent ridges, it is generally somewhat inconvenient for the operator to fit the snap gauge up against the bar of the height gauge.

Accordingly, it has been customary to not make use of highly accurate micrometer height gauges for checking the settings of snap gauges. Instead, snap gauges are generally checked for accuracy and recalibrated using one or more very accurately machined blocks. Generally more than one block is necessary and the blocks are stacked one upon the other until the precise and exact thickness setting of the gauge is reached. Choosing the correct combination of blocks to obtain the desired dimension is time consuming and retaining the blocks in a stacked position while setting the gauge is extremely tedious and difficult, particularly on larger snap gauges. Frequently a manufacturer will have thousands of snap gauges and many man hours are consumed just in the periodic checking and calibration of the snap gauges.

Accordingly, it is the object of the present invention to provide an adjustable master setting gauge with all of the accuracy of a micrometer height gauge and which can be conveniently and quickly used to check and calibrate snap gauges of many sizes.

SUMMARY OF THE INVENTION

The invention comprises an adjustable master setting gauge. The gauge includes a frame having a generally flat portion. A height gauge fixture comprising a bar, one end of which is slidably supported within a base and the other end of which is telescopically attached to a micrometer head, the bar being mounted generally parallel to the flat portion, also form a part of the master setting gauge. A bracket extends from the frame, the bracket including a first gauging surface laterally removed from the bar. The master setting gauge further includes a gauge mounting member detachably attachable to the bar, the gauge mounting member having an arm extending laterally from the bar, the arm including a second gauging surface, the first and second gauging surfaces being laterally removed generally an equal distance from the bar and being linearly parallel to the bar.

BRIEF DESCRIPTION OF THE DRAWINGS

The invention will be better understood by reference to the drawings wherein like numbers denote like parts throughout and wherein:

FIG. 1 illustrates in side elevational view an adjustable master setting gauge embodying the principles of the present invention.

FIG. 2 illustrates an enlarged partial top view of the gauge of FIG. 1.

FIG. 3 illustrates a sectional view taken along the line III —III of FIG. 1; and FIG. 4 illustrates an enlarged sectional view of a detail of the present invention taken along the line IV —IV of FIG. 3.

DESCRIPTION OF THE PREFERRED EMBODIMENT

Referring now to the drawings, wherein the preferred embodiment of the invention is illustrated, an adjustable master setting gauge in accordance with the teachings of the invention, is generally indicated by the reference numeral 10. The master setting gauge 10 includes a height gauge fixture 12 attached to a frame 14. A bracket 16 extends from the frame 14 and has attached thereto in a generally fixed manner relative to the frame 14 a gauging surface 18. A second gauging surface 20 is provided which rides along with and is detachably attachable to the bar 22 of the height gauge fixture 12.

The height gauge fixture 12 is of generally conventional design and includes the previously mentioned bar 22 the one end 24 of which is slidably supported within a bore 26 within a base 28. Extending from the base 28 is an elongated open-sided column 30. Attached to the other end 32 of the bar 22 is a conventional micrometer head 34 with a conventional digital read-out window 36 and a lock screw 38. The bar 22 is mounted generally parallel to a flat portion 40 which forms a necessary part of the frame 14.

The frame 14 in addition to having the flat portion 40, also includes a wall 42 and an end plate 44. The wall 42 is parallel to the bar 22 and is upraised perpendicularly from the flat portion 40. The end plate 44 is secured generally perpendicularly to the flat portion 40 and to the wall 42. The base 28 of the height gauge fixture 12 is ridgedly attached in spaced relationship to the end plate 44 of the frame 14. The flat portion 40 and the wall 42 of the frame 14 are secured parallel to the bar 22 of the height gauge fixture 12.

The bracket 16 in the preferred embodiment of the invention is attached to the flat portion 40 of the frame 14 via the bolts 46 and the dowel pins 48, whereby the bracket 16 is held in fixed relationship relative to the frame 14. An elongated gauge block 50 is secured to the upper end of the bracket 16 by a pair of vertically aligned bolts 52. Generally, the gauging surface 18 of the gauge block 50 is adjusted by the bolts 52, so that when the micrometer head 34 is adjusted so that the digital read-out window 36 reads 0, i.e. when the bar 22 is at one end of its path, then the gauging surface 18 is coplanar with one of the plurality of parallel faces 54 of the upraised annular ridges 56 on the bar 22. The parallel faces 54 on the bar 22 are generally spaced exactly a desired distance apart. For example, the faces 54 can be spaced one inch apart, one centimeter apart or the like.

Alignment of the height fixture gauge 12 relative to the frame 14 is generally provided by one or more locator blocks 58 upraised from the frame 14. The locator blocks 58 generally fit within cavities 60 in the open-sided column 30. References to FIG. 3 illustrate one of a plurality of bolts 61 which serve to hold the open-sided column 30 against the frame 14.

The base 28 of the height gauge fixture 12 is generally fastened in spaced apart relationship from the end plate 44 of the frame 14 as via the bolt 62 extending through locator bushings 64 disposed in bores 66 formed in the end plate 44.

The frame 14 includes an elongated guide rod 68 disposed parallel to the bar 22. The rod 68 extends through a bore 70 in the end plate 44 and through a boss 72 generally weldably attached to the wall 42. The rod 68 is secured within the bore 70 by a set screw 74. The end of the rod 68 removed from the boss 72 is secured to the wall 42 by a support block 76 held in place by a pair of bolts 78.

A guide block 80 is slidably and pivotally mounted on the rod 68 by means of a ball bearing bushing 82. A gauge mounting member 84 is detachably attachable to the bar 22. The gauge mounting member 84 includes an arm 86 thereof which extends laterally from the bar 22, said arm 86 including said second gauging surface 20 there attached, said second gauging surface 20 being laterally removed from said bar 22 generally an equal distance from said bar 22 as is said first gauging surface 18, said gauging surfaces 18 and 20 being generally parallel to one another. The gauge mounting member 84 is attached to the guide block 80 via the stud 88. The gauge mounting member 84 includes a cavity 90 therein adapted to mateably receive the bar 22 between adjacent ridges 56. The gauge mounting member 84 includes a seat 92 formed thereon adapted to seat against one of the faces 54 of a selected ridge 56. A plurality of locking screws 94 are screw-threadably disposed in threaded bores 96 as illustrated most clearly in FIG. 4, formed in the gauge mounting member 84. The locking screws 94 have tapered conical ends 98 formed thereon for engagement with pins 100. Adjusting the locking screws 94 inwardly causes the conical ends thereof 98 to force the pins 100 into engagement with an adjacent ridge 56. This exerts an expansive force between the ridge facing the face 54 against which the seat 92 is positioned and said adjacent ridge. Thus the seat 92 is wedged into intimate engagement with the selected face 54. A gauge block 102 is secured to the gauge mounting member 84 and has the second gauging surface 20 disposed parallel to the faces 54 and generally precisely a distance generally equal to the separation of successive faces 54 from the seat 92 of the gauge mounting member 84.

OPERATION

In operation, the guide block 80 is slid along the rod 68 until the second gauging surface 20 is a desired number of successive face 54 separations away from the first gauging surface 18. Then the gauge mounting member 84 is attached between two adjacent upraised ridges 56 by use of the set screws 94. The micrometer head 34 is then manipulated so that the decimal portion of the dimension of the gauge to be checked appears in the digital read-out window 36 with the fine adjustments being provided by conventional calibrations (not illustrated) on the micrometer head 34. The separation between the first gauging surface 18 and the second gauging surface 20 is then equal to the number of ridge 56 (or face 54) separation distances between the gauging surfaces 18 and 20 plus the reading in the window 36. If for example the separation between successive ridges 56 is 1 centimeter and the snap gauge to be calibrated is exactly 4 centimeters then the first gauging surface and second gauging surface will be placed precisely 4 centimeters apart (four ridge 56 separations) and the micrometer head 34 will be set so that the reading in the window 36 is 0. On the other hand, if the snap gauge is to be set for 4.573 centimeters, the first gauging surface 18 and the second gauging surface 20 will again be set 4 centimeters apart but the micrometer head 34 will be rotated so as to move the second gauging surface 20 until the reading in the window 36 is 0.573 centimeter whereupon the first gauging surface 18 and the second gauging surface 20 will be exactly 4.573 centimeters apart.

FIG. 2 in particular illustrates the checking of a snap gauge 104 between the first gauging surface 18 and the second gauging surface 20. It will be noted that the frame 14 can be positioned at any angle to the horizontal and still be completely operable, thus the height gauge fixture portion 12 of the master setting gauge of the invention, which is normally operable only in a vertical position, is made operable in any position through attachment to the frame 14 in the manner illustrated.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An adjustable master setting gauge, comprising:

a height gauge fixture comprising a bar;

a base;

means for slidably supporting one end of said bar within said base;

a micrometer head telescopically attached to the other end of said bar, said bar having a plurality of parallel ridges annularly upraised therefrom, said ridges having flat faces thereon which are perpendicular to the axis of said bar and are at precisely spaced intervals from one another;

means adapted to telescopically move said bar a distance generally equal to at least one of said precisely spaced intervals;

a linearly extending frame including a generally flat portion extending generally the length of said gauge;

means mounting said gauge to said frame with said bar generally parallel to said flat portion;

a bracket mounted to and extending from said frame intermediate the ends thereof and including a first gauging surface parallel to said faces and alignable to be coplanar with a respective one of said faces via telescopic movement of said bar through adjustment of said micrometer head, said first gauging surface being laterally spaced from said bar;

a rod mounted parallel to said bar and said frame and spaced therefrom;

means for mounting said rod to said frame;

a gauge mounting member detachably attachable to said bar having an arm extending laterally from said bar, said arm including a second gauging surface aligned to be parallel to said faces and spaced at a precise distance longitudinally therefrom and alignable to be coplanar with any one of said faces, said first and second gauging surfaces being laterally spaced generally an equal distance from said bar;

a guide block; and means for slidably and pivotally mounting said guide block to said rod, said gauge mounting member being attached to said block.

2. A gauge as in claim 1, wherein said means for mounting said rod includes a wall parallel to said bar upraised perpendicularly from said flat portion thereof, said rod being supported by said wall.

3. A gauge as in claim 2, wherein said frame includes an end plate secured generally perpendicularly to said flat portion and to said wall, said base being ridgedly attached in spaced relation to said end plate.

4. A gauge as in claim 3, including:

an elongated open-sided column extending interconnectingly from said base to said micrometer head; and means for removably securing said column to said frame.

5. A gauge as in claim 4, wherein said gauge mounting member includes a cavity adapted to mateably receive said bar between adjacent of said ridges, a seat adapted for positioning against one of said faces and a plurality of locking elements adapted to exert an expansive force between the ridge facing said face and said face to secure said seat thereagainst.

6. In a height gauge fixture comprising a bar, one end of which is slidably supported within a base, a micrometer head telescopically attached to the other end of said bar, said bar having a plurality of parallel ridges annularly upraised therefrom, said ridges having flat faces thereon which are perpendicular to the axis of said bar and are at precisely spaced intervals from one another, said micrometer head being adapted to telescopically move said bar a distance generally equal to at least one of said precisely spaced intervals, an improvement making said height gauge fixture into an adjustable master setting gauge, comprising:

a linearly extending frame including a generally flat portion extending generally the length of said fixture, said fixture being mounted to said frame with said bar generally parallel to said flat portion;

A bracket mounted to and extending from said frame intermediate the ends thereof and including a first gauging surface parallel to said faces and alignable to be coplanar with a respective one of said faces via telescopic movement of said bar through adjustment of said micrometer head, said first gauging surface being laterally removed from said bar;

a rod;

means mounting said rod parallel to said bar and said frame and spaced therefrom;

a gauge mounting member detachably attachable to said bar having an arm extending laterally from said bar, said arm including a second gauging surface aligned to be parallel to said faces and spaced at a precise distance longitudinally therefrom and alignable to be coplanar with any one of said faces, said first and second gauging surfaces being laterally removed generally an equal distance from said bar; and means slidably and pivotally mounted on said rod and attached to said gauge mounting member.

* * * * *